United States Patent
Ronen et al.

(10) Patent No.: US 11,630,958 B2
(45) Date of Patent: Apr. 18, 2023

(54) DETERMINING TOPIC LABELS FOR COMMUNICATION TRANSCRIPTS BASED ON A TRAINED GENERATIVE SUMMARIZATION MODEL

(71) Applicant: Microsoft Technology Licensing, LLC, Redmond, WA (US)

(72) Inventors: Royi Ronen, Tel Aviv (IL); Yarin Kuper, Tel Aviv (IL); Tomer Rosenthal, Kirkland, WA (US); Abedelkader Asi, Kfar Bara (IL); Erez Altus, Tel Aviv (IL); Rona Shaanan, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 17/336,881

(22) Filed: Jun. 2, 2021

(65) Prior Publication Data

US 2022/0391591 A1 Dec. 8, 2022

(51) Int. Cl.
*G06F 40/30* (2020.01)
*G06F 40/166* (2020.01)
(Continued)

(52) U.S. Cl.
CPC ............ *G06F 40/30* (2020.01); *G06F 16/345* (2019.01); *G06F 40/117* (2020.01);
(Continued)

(58) Field of Classification Search
CPC ...... G06F 40/30; G06F 40/117; G06F 40/166; G06F 16/345
See application file for complete search history.

(56) References Cited

U.S. PATENT DOCUMENTS

| | | |
|---|---|---|
| 5,694,523 A | 12/1997 | Wical |
| 7,702,680 B2 | 4/2010 | Yih et al. |

(Continued)

FOREIGN PATENT DOCUMENTS

| | | |
|---|---|---|
| CN | 105005918 A | 10/2015 |
| CN | 111241267 A | 6/2020 |

(Continued)

OTHER PUBLICATIONS

Pirmin Lemberger, "Deep Learning Models for Automatic Summarization The Next Big Thing in NLP?" May 13, 2020, 19 pages, https://towardsdatascience.com/deep-learning-models-for-automatic-summarization-4c2b89f2a9ea (Year: 2020).*

(Continued)

*Primary Examiner* — Benjamin Smith
(74) *Attorney, Agent, or Firm* — Barta, Jones & Foley, PLLC

(57) ABSTRACT

The disclosure herein describes determining topics of communication transcripts using trained summarization models. A first communication transcript associated with a first communication is obtained and divided into a first set of communication segments. A first set of topic descriptions is generated based on the first set of communication segments by analyzing each communication segment of the first set of communication segments with a generative language model. A summarization model is trained using the first set of communication segments and associated first set of topic descriptions as training data. The trained summarization model is then applied to a second communication transcript and, based on applying the trained summarization model to the second communication transcript, a second set of topic descriptions of the second communication transcript is generated. By training the summarization model based on output of the generative language model, it enables efficient, (Continued)

accurate generation of topic descriptions from communication transcripts.

17 Claims, 8 Drawing Sheets

(51) Int. Cl.
| | |
|---|---|
| *G06F 40/117* | (2020.01) |
| *G06F 40/284* | (2020.01) |
| *G06N 20/00* | (2019.01) |
| *G10L 15/26* | (2006.01) |
| *G10L 15/22* | (2006.01) |
| *G06F 16/34* | (2019.01) |
| *G06F 40/279* | (2020.01) |

(52) U.S. Cl.
CPC .......... *G06F 40/166* (2020.01); *G06F 40/279* (2020.01); *G06F 40/284* (2020.01); *G06N 20/00* (2019.01); *G10L 15/22* (2013.01); *G10L 15/26* (2013.01)

(56) References Cited

U.S. PATENT DOCUMENTS

| | | | | |
|---|---|---|---|---|
| 8,818,808 | B2* | 8/2014 | Hakkani-Tur | G10L 15/063 704/243 |
| 8,914,452 | B2* | 12/2014 | Boston | G06Q 10/10 709/206 |
| 9,110,977 | B1* | 8/2015 | Pierre | G06F 16/48 |
| 9,799,228 | B2* | 10/2017 | Chen | G10L 15/063 |
| 9,880,807 | B1* | 1/2018 | Haggerty | G06F 3/167 |
| 10,410,385 | B2* | 9/2019 | Banerjee | G06T 11/206 |
| 10,482,119 | B2 | 11/2019 | Kataria et al. | |
| 10,510,328 | B2* | 12/2019 | Nazer | G10L 15/14 |
| 10,642,889 | B2* | 5/2020 | Reshef | G06F 16/685 |
| 10,679,182 | B2* | 6/2020 | Kadowaki | G10L 15/1822 |
| 10,770,044 | B2* | 9/2020 | Nazer | G06F 16/685 |
| 10,867,209 | B2* | 12/2020 | Coven | H04L 67/34 |
| 10,945,040 | B1* | 3/2021 | Bedi | G10L 15/26 |
| 10,965,812 | B1* | 3/2021 | Das | G06F 40/216 |
| 10,997,369 | B1* | 5/2021 | Frazier | G06F 40/35 |
| 11,062,270 | B2* | 7/2021 | Hilleli | G06F 40/216 |
| 11,074,475 | B2* | 7/2021 | Coven | G06K 9/6227 |
| 11,128,483 | B1* | 9/2021 | Surazski | G06V 20/30 |
| 11,151,982 | B2* | 10/2021 | Tomkins | G06N 20/00 |
| 11,222,167 | B2* | 1/2022 | Gehrmann | G06F 40/284 |
| 11,232,266 | B1* | 1/2022 | Biswas | G06F 40/35 |
| 11,270,061 | B2* | 3/2022 | Herzig | G06F 16/345 |
| 11,310,257 | B2* | 4/2022 | Argoeti | H04L 63/1408 |
| 11,315,569 | B1* | 4/2022 | Talieh | G06F 40/20 |
| 11,328,732 | B2* | 5/2022 | Hou | G06F 16/31 |
| 11,410,643 | B2* | 8/2022 | Andreas | G06F 9/54 |
| 11,449,977 | B2* | 9/2022 | Steiman | G06F 17/18 |
| 11,461,379 | B1* | 10/2022 | Mukherjee | G06N 3/08 |
| 11,501,780 | B2* | 11/2022 | Adlersberg | G06F 40/35 |
| 2006/0190253 | A1* | 8/2006 | Hakkani-Tur | G10L 15/26 704/243 |
| 2013/0325972 | A1* | 12/2013 | Boston | G06Q 10/10 709/204 |
| 2014/0199676 | A1* | 7/2014 | Chen | G10L 15/01 434/362 |
| 2015/0356127 | A1* | 12/2015 | Pierre | G06F 40/211 707/706 |
| 2016/0049083 | A1* | 2/2016 | Brinton | G09B 5/12 434/309 |
| 2016/0275109 | A1* | 9/2016 | Yentis | G06F 40/166 |
| 2016/0277577 | A1* | 9/2016 | Yentis | G06F 3/04817 |
| 2017/0063747 | A1 | 3/2017 | Chung et al. | |
| 2017/0243382 | A1* | 8/2017 | Banerjee | G06Q 10/107 |
| 2018/0239822 | A1* | 8/2018 | Reshef | G06F 40/284 |
| 2019/0065469 | A1* | 2/2019 | Nazer | G06N 20/00 |
| 2019/0066641 | A1* | 2/2019 | Nazer | G10H 1/0008 |
| 2019/0108418 | A1* | 4/2019 | Coven | G06F 9/4411 |
| 2019/0108419 | A1* | 4/2019 | Coven | G06F 9/44505 |
| 2019/0130903 | A1* | 5/2019 | Sriram | G10L 15/20 |
| 2020/0046285 | A1* | 2/2020 | Shimmei | A61B 5/7275 |
| 2020/0074312 | A1 | 3/2020 | Liang et al. | |
| 2020/0126583 | A1* | 4/2020 | Pokharel | G10L 15/1822 |
| 2020/0175961 | A1* | 6/2020 | Thomson | G10L 15/28 |
| 2020/0274894 | A1* | 8/2020 | Argoeti | G06F 7/556 |
| 2021/0099317 | A1* | 4/2021 | Hilleli | G06F 40/30 |
| 2021/0192126 | A1* | 6/2021 | Gehrmann | G06N 20/00 |
| 2021/0264097 | A1* | 8/2021 | Herzig | G06F 40/289 |
| 2021/0295822 | A1* | 9/2021 | Tomkins | G06F 16/328 |
| 2021/0374188 | A1* | 12/2021 | Miller | G06N 20/00 |
| 2021/0375289 | A1* | 12/2021 | Zhu | G10L 15/26 |
| 2022/0020388 | A1* | 1/2022 | Trim | G10L 25/84 |
| 2022/0021551 | A1* | 1/2022 | Trim | H04L 12/1818 |
| 2022/0026862 | A1* | 1/2022 | Guha | G06N 20/00 |
| 2022/0027572 | A1* | 1/2022 | Biswas | G06F 40/30 |
| 2022/0036538 | A1* | 2/2022 | Steiman | G06N 3/0472 |
| 2022/0067384 | A1* | 3/2022 | Kaushik | G06N 20/00 |
| 2022/0067385 | A1* | 3/2022 | Kaushik | G06V 40/20 |
| 2022/0083738 | A1* | 3/2022 | Frazier | G06N 3/049 |
| 2022/0084524 | A1* | 3/2022 | Hou | G06F 16/31 |
| 2022/0108086 | A1* | 4/2022 | Wu | G06F 40/35 |
| 2022/0114186 | A1* | 4/2022 | Frazier | G06F 16/242 |
| 2022/0122587 | A1* | 4/2022 | Thomson | G10L 15/06 |
| 2022/0172725 | A1* | 6/2022 | Khan Khattak | G10L 15/1822 |
| 2022/0188525 | A1* | 6/2022 | Trim | G06F 40/289 |
| 2022/0229984 | A1* | 7/2022 | Miao | G06F 40/289 |
| 2022/0237373 | A1* | 7/2022 | Singh Bawa | G06F 16/345 |
| 2022/0253593 | A1* | 8/2022 | Yamasaki | G06F 40/289 |
| 2022/0318288 | A1* | 10/2022 | Mukherjee | G06N 20/00 |
| 2022/0391591 | A1* | 12/2022 | Ronen | G06F 40/284 |

FOREIGN PATENT DOCUMENTS

| | | |
|---|---|---|
| CN | 111639175 A | 9/2020 |
| CN | 111818393 A | 10/2020 |
| CN | 112507111 A | 3/2021 |

OTHER PUBLICATIONS

"International Search Report and Written Opinion Issued in PCT Application No. PCT/US22/027969", dated Aug. 25, 2022, 11 Pages.

* cited by examiner

DETERMINING TOPIC LABELS FOR COMMUNICATION TRANSCRIPTS BASED ON A TRAINED GENERATIVE SUMMARIZATION MODEL

BACKGROUND

Customer Relationship Management (CRM) conversations and other related communications are lucrative targets for analysis. Accurately and efficiently identifying segments of conversations and determining topics of those segments with a high degree of specificity (e.g., being able to accurately determine topics from a set of many possible topics). Scaling up to the use of many possible topics may require a large quantity of labeled data and customization of topics also requires additional time and effort.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for determining topics of communication transcripts is described. A first communication transcript associated with a first communication is obtained and the first communication transcript is divided into a first set of communication segments. A first set of topic descriptions is generated based on the first set of communication segments by analyzing each communication segment of the first set of communication segments with a generative language model. A summarization model is trained using the first set of communication segments and associated first set of topic descriptions as training data. The trained summarization model is then applied to a second communication transcript and, based on applying the trained summarization model to the second communication transcript, a second set of topic descriptions of the second communication transcript is generated.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 8, the systems are illustrated as schematic drawings. The drawings may not be to scale.

DETAILED DESCRIPTION

Figure 1:
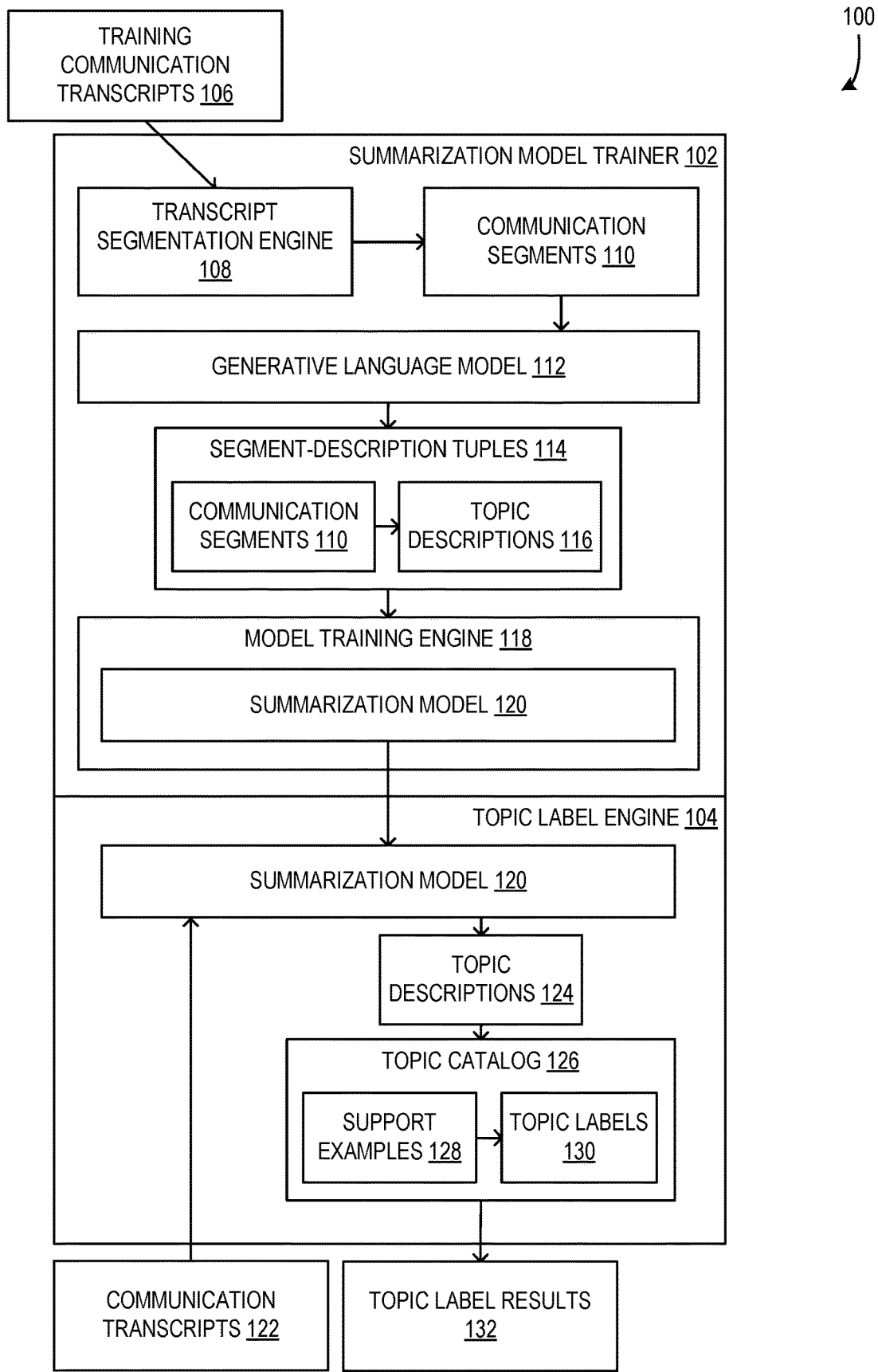
FIG. 1 is a block diagram illustrating a system configured for determining topic labels of communication transcripts according to an embodiment.

Aspects of the disclosure provide a computerized method and system for training a summarization model and using that trained summarization model to identify topic labels of segments of communication transcripts. Training communication transcripts associated with some conversations or other communications (e.g., communications indicative of the types of communications that will be analyzed) are obtained and the transcripts are divided into communication segments. Then, a generative language model (GLM), such as GPT-3, is used with each of the segments to generate associated topic descriptions. The pairs of segments and topic descriptions are used as training data to generate a summarization model, such that the summarization model is configured to generate topic descriptions when applied to communication segments. The trained summarization model may then be applied to other communication transcripts and, based on applying the trained summarization model, topic descriptions of those communication transcripts are generated. Additionally, a topic catalog may be defined to include a set of topic labels and support examples (e.g., example topic descriptions) associated with each of those topic labels. The topic descriptions output from the summarization model may be compared to the support examples of the topic catalog and, based on identifying matching support examples, the topic descriptions are mapped to the associated topic labels. Those topic labels may be provided as output in response to received communication transcripts.

The disclosure operates in an unconventional manner by leveraging a GLM such as GPT-3 to teach a smaller, more focused generative model and then normalizing the output of that model into a fixed set of topics (e.g., the topic labels from the topic catalog). The use of a large GLM to train a more focused model results in improved performance and reduced resource requirements at generating topic descriptions at runtime, as the larger, more general GLM may have significantly larger resource and processing requirements. Further, the normalization of the output of the trained model by mapping it to discriminative topic labels via the topic catalog reduces or eliminates the effects of hallucinations and/or vulnerability to adversarial attacks of using just GLMs to generate topic descriptions.

Additionally, the disclosure enables the generation of customized, focused summarization models and customized topic catalogs, enabling the finalized topic label systems and methods to be fine-tuned for analysis of specific types of communications. Users may be enabled to provide a customized set of topic labels and associated support examples. Further, the disclosure may be configured to provide recommended support examples to a user in response to a set of customized topic labels. The use of the described topic catalog and associated mapping methods enables users to edit and/or add to the set of topic labels that may be identified with respect to input communication transcripts, which reduces manual effort and improves the flexibility of the described communication analysis systems and methods.

FIG. 1 is a block diagram illustrating a system 100 configured for determining topic labels 130 of communication transcripts 122 according to an embodiment. The system includes a summarization model trainer 102 configured to train a summarization model 120 and a topic label engine 104 configured to use the summarization model 120 to generate topic label results 132 from communication transcripts 122. In some examples, the system 100 is located, stored, and/or executed on a computing device such as a personal computer, server device, tablet computing device or other mobile device, or the like. For instance, a server device may be configured to execute the operations of the summarization model trainer 102 and the topic label engine 104.

Alternatively, in other examples, the system 100 is distributed across multiple computing devices, such that components, elements, and/or parts of the system 100 may be located and/or executed on different computing devices that are in communication with each other (e.g., via one or more communication networks, such as internal networks, the Internet, or the like). For instance, the system 100 may be configured to store data associated with operations of the summarization model trainer 102 and/or topic label engine 104 on one or more distributes storage devices and/or the system 100 may be configured to execute the summarization model trainer 102 and/or the topic label engine 104 on one or more distributed computing devices (e.g., the summarization model trainer 102 is executed on a first server device and the topic label engine 104 is executed on a second server device). In other examples, other arrangements of computing devices may be used to implement the system 100 without departing from the description.

The summarization model trainer 102 includes hardware, firmware, and/or software configured to train a summarization model 120 based on training communication transcripts 106. The summarization model trainer 102 includes a transcript segmentation engine 108 configured to divide the training communication transcripts 106 into communication segments 110, a generative language model 112 (GLM) that generates segment-description tuples 114 from the communication segments 110, and a model training engine 118 that trains and/or tunes a summarization model 120 using the segment-description tuples 114 as described herein.

In some examples, the training communication transcripts 106 include natural language text data of the language used during a communication, such as a telephone call, video call, instant messaging chat log, and/or other forms of conversation between two parties. In related examples, single-party communications, such as voice mail, may be analyzed as described herein without departing from the description. The training communication transcripts 106 may be generated manually by a transcriptionist that listens to or otherwise observes the associated communications and/or they may be automatically generated using speech-to-text or voice-to-text analyses of an audio stream or other record of the communication. Additionally, or alternatively, the training communication transcripts 106 may include data indicating words and phrases used during the communication and/or other data associated with the communication, such as punctuation used, timing data associated the communication (e.g., when words are said, length of pauses between sentences, or the like).

The transcript segmentation engine 108 includes hardware, firmware, and/or software configured to divide a transcript of a communication, such as training communication transcripts 106, into communication segments 110. In some examples, the transcript segmentation engine 108 is configured to divide a transcript 106 into communication segments 110 by identifying approximate coherent thematic portions of the communication (e.g., each segment 110 includes communication data of the communication associated with a single topic and each segment 110 may be associated with a different topic from other segments 110 of the transcript 106). For instance, the transcript segmentation engine 108 may be configured to identify each sentence in the transcript 106 and vectorize the identified sentences (e.g., using Bidirectional Encoder Representations from Transformers (BERT) techniques or the like). The sentence vectors of the transcript 106 may then be split into groups based similarity (e.g., the groups of sentence vectors may be determined based on maximizing the accumulated weighted cosine similarity by using the textsplit implementation or the like). The resulting communication segments 110 include groups of sentences from the transcript 106 being analyzed that are grouped such that all sentences in a group are related to a particular topic. It should be understood that, in other examples, other techniques may be used to divide training communication transcripts 106 into communication segments 110 of sentences grouped by topics without departing from the description herein.

In some examples, the communication segments 110 from the training communication transcripts 106 are provided to a GLM 112 (e.g., Generative Pre-Trained Transformer 3 (GPT-3)) and/or the GLM 112 is applied to the communication segments 110. Each communication segment 110 may be processed separately using the GLM 112 as described herein. The GLM 112 includes hardware, firmware, and/or software configured to interpret the language of the communication segments 110 and generate topic descriptions 116 associated with the communication segments 110, which are associated with those communication segments 110 in segment-description tuples 114 as shown in FIG. 1. It should be understood that, in other examples, other data arrangements or organizations may be used to represent the association between communication segments 110 and topic descriptions 116 without departing from the description herein.

Figure 2:
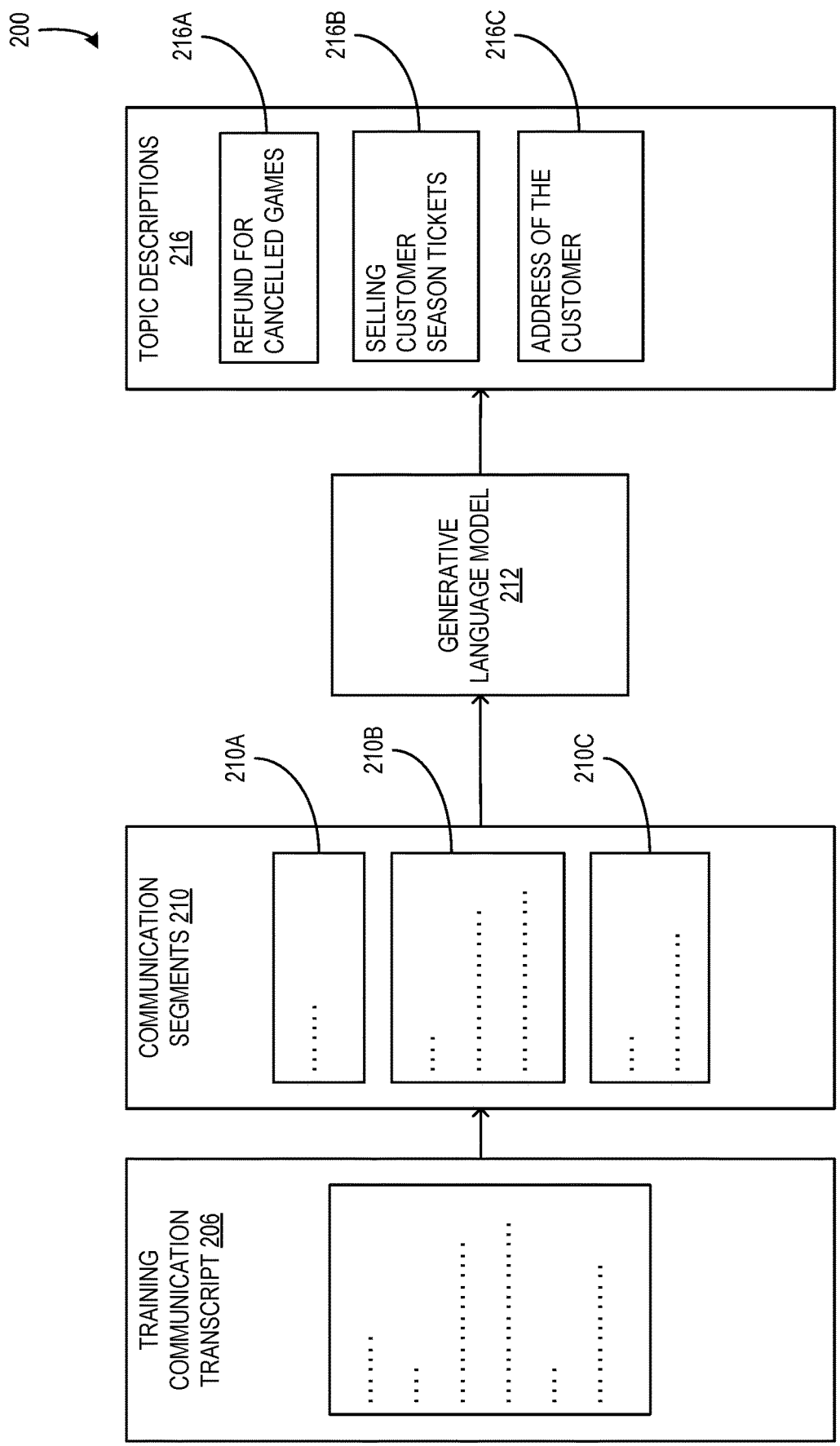
FIG. 2 is a diagram illustrating generation of topic descriptions from a training communication transcript using a generative language model according to an embodiment.

FIG. 2 is a diagram 200 illustrating generation of topic descriptions 216 from a training communication transcript 206 using a GLM 212 according to an embodiment. In some examples, the diagram 200 illustrates a process that is performed in a system such as system 100 of FIG. 1. The training communication transcript 206 is divided into communication segments 210 (e.g., segments 210A, 210B, and 210C) and each of those segments 210 is provided as input to the GLM 212. The result is the topic descriptions 216, which include descriptions for each of the segments 210 in the form of topic descriptions 216A, 216B, and 216C. In some examples, the GLM 212 generates one topic description 216 for each communication segment 210 (e.g., description 216A for segment 210A, description 216B for segment 210B, and description 216C for segment 210C). Alternatively, the GLM 212 may be configured to generate one or more topic descriptions 216 for each communication segment 210 (e.g., the GLM 212 may identify two possible topic descriptions 216 for a segment 210 and provide both as descriptions 216 for that segment 210).

In some examples, the GLM 212 is trained to interpret and/or produce human-like natural language text using deep learning techniques, such as how the GPT-3 model is configured. The GLM 212 may be configured to perform natural language processing (NLP) on a communication segment 210 and to generate a natural language human-like topic description 216 of the communication segment 210 (e.g., a phrase, sentence, or paragraph that describes the topic of the communication segment 210). In some examples, in addition to providing a communication segment 210 to the GLM 212 for processing, the GLM 212 is also prompted to provide a topic description of the provided communication segment 210 (e.g., the GLM 212 may be asked a question, such as "What topic is discussed in this segment?" or the like). In such examples, the GLM 212 is configured and/or trained to interpret both the segment and the associated prompt and to respond to the prompt with a human-like response.

Returning to FIG. 1, the segment-description tuples 114 generated using the topic descriptions 116 from the GLM 112 are used as training data by the model training engine 118. The model training engine 118 includes hardware, firmware, and/or software configured to train a summarization model 120 using the segment-description tuples 114 as input. The model training engine 118 may be configured to use machine learning techniques to train the summarization model 120 to accurately assign topic descriptions to input communication segments. In this way, a trained summarization model 120 generates topic descriptions from communication segments that are substantially similar to the topic descriptions 116 that would be generated by the GLM 112 from the same communication segments.

However, the trained summarization model 120 has the advantage of being smaller and less resource intensive than the GLM 112, which is configured to interpret and generate natural language in a more general capacity. The trained summarization model 120 is fine-tuned to mimic the output of the GLM 112 for a much narrower set of possible outputs (e.g., the summarization model 120 may only assign a topic description that has been previously generated by the GLM 112 in the segment-description tuples 114). These differences between the summarization model 120 and the GLM 112 result in the summarization model 120 having a narrower set of potential uses, but being more resource and/or time efficient at those potential uses than the more general GLM 112.

Figure 3:
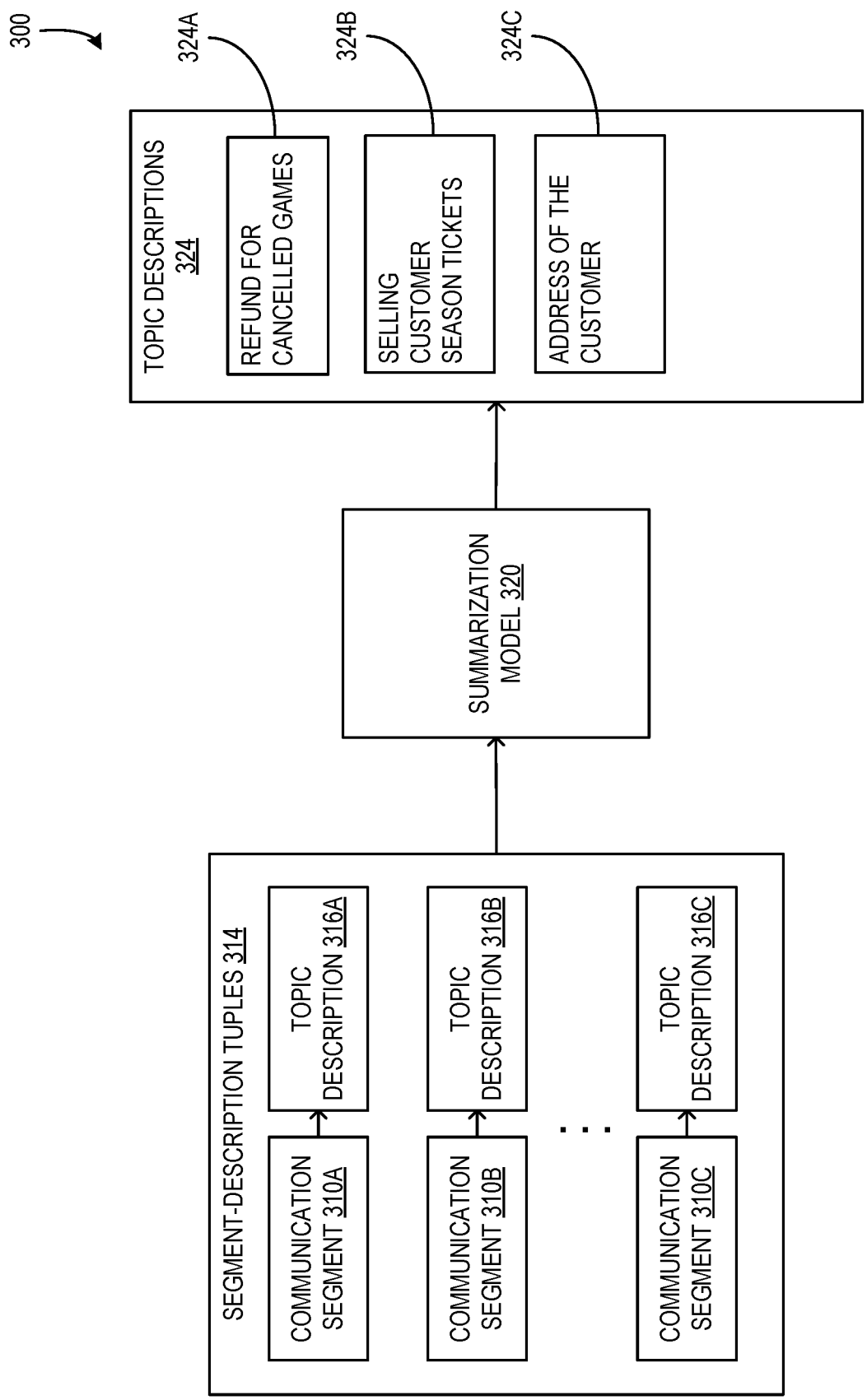
FIG. 3 is a diagram illustrating training of a summarization model based on segment-description tuples according to an embodiment.

FIG. 3 is a diagram 300 illustrating training of a summarization model 320 based on segment-description tuples 314 according to an embodiment. In some examples, the process illustrated in diagram 300 is performed in a system such as system 100 of FIG. 1. The tuples 314, including a tuple of communication segment 310A and topic description 316A, a tuple of communication segment 310B and topic description 316B, and a tuple of communication segment 310C and topic description 316C, are used as example inputs and outputs to train the summarization model 320 to generate and/or assign similar topic descriptions 324 (e.g., descriptions 324A, 324B, and 324C) to similar provided communication segments (e.g., segments of communication transcripts 122).

In some examples, the summarization model 320 is trained using machine learning techniques (e.g., by a summarization model trainer 318). The summarization model 320 may be trained using the segment-description tuples 314 which indicate an accurate set of topic descriptions based on the associated communication segments. Such training data may include data of many different varieties of communication segments mapped to associated accurate topic descriptions. The segment-description tuples 314 may be used to train the summarization model 320 to identify accurate topic descriptions (e.g., from a set of different topic descriptions provided in the segment-description tuples 314) when provided communication segments.

In some examples, the training of the summarization model 320 includes machine learning techniques that use, for instance, a trained regressor such as a random decision forest, a directed acyclic graph, a support vector machine, a convolutional neural network or other neural network, or another trained regressor. It should further be understood that the training of the summarization model 320 may make use of the segment-description tuples 314 as training data pairs when applying machine learning techniques and/or algorithms. Millions of training data pairs may be stored in a machine learning data structure (e.g., of the system 100) for use in training the summarization model 320.

Additionally, or alternatively, training the summarization model 320 may include fine-tuning the summarization model 320 as a distilled summarization model such as distil-BART 12-6, such that the summarization model 320 is configured to generate a short abstractive topic description that approximates the topic description that would have been generated by a GLM 112.

Returning to FIG. 1, after the summarization model 120 has been trained by the model training engine 118 as described herein. The model 120 is provided to the topic label engine 104 portion of the system. The topic label engine 104 is then configured to receive and/or otherwise obtain communication transcripts 122, provide the segments of those transcripts 122 to the summarization model 120 to generate associated topic descriptions 124, map those topic descriptions 124 to topic labels 130 of the topic catalog 126, and provide those topic labels as topic label results 132 in response to the communication transcripts 122.

In some examples, the topic label engine 104 is configured to divide the communication transcripts 122 into communication segments in a substantially similar manner as the transcript segmentation engine 108 described herein. Additionally, or alternatively, the transcript segmentation engine 108 of the system 100 may be used in both the summarization model trainer 102 and the topic label engine 104. Alternatively, each of the summarization model trainer 102 and topic label engine 104 may be configured to include a transcript segmentation engine 108 for dividing transcripts into segments as described herein.

Further, the topic label engine 104 is configured to provide segments of the communication transcripts 122 to the summarization model 120 and/or to otherwise apply the summarization model 120 to the segments of the transcripts 122. As a result, the summarization model 120 generates and assigns topic descriptions 124 to the processed transcript segments.

After the topic descriptions 124 are generated, they are used in combination with the topic catalog 126 to identify topic labels 130 that best fit the segments of the communication transcripts 122. In some examples, the topic catalog 126 includes support examples 128 which are associated with topic labels 130. Each topic label 130 may be associated with a set of support examples 128 that are similar to the topic descriptions 124 that may be generated from the summarization model 120. Alternatively, or additionally, the support examples 128 may include words, sentences, or other phrases that are likely to be indicative of the associated topic label 130. Topic catalogs are described in greater detail with respect to FIG. 4.

Figure 4:
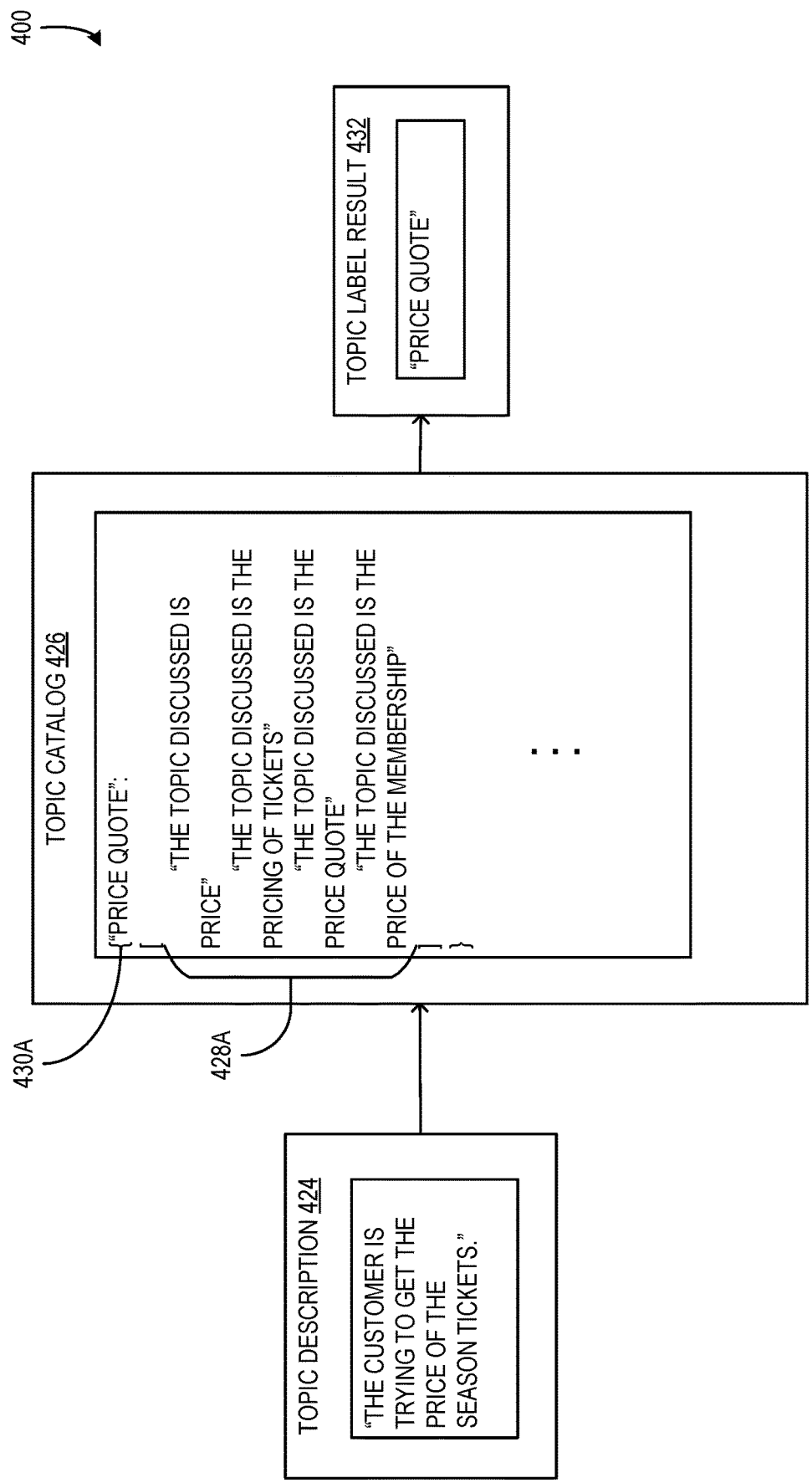
FIG. 4 is a diagram illustrating mapping of a topic description to a topic label in a topic catalog according to an embodiment.

FIG. 4 is a diagram 400 illustrating mapping of a topic description 424 to a topic label 430A in a topic catalog 426 according to an embodiment. In some examples, the process illustrated in diagram 400 is performed in a system such as system 100 of FIG. 1. The topic description 424 is used with the topic catalog 426 to determine that the topic label 430A, "Price Quote", is the best fit for the topic description 426, such that "Price Quote" is provided as a topic label result 432.

In some examples, the topic description 424 is compared to some or all of the support examples in the topic catalog 426 (e.g., support examples 428A mapped to or otherwise associated with the topic label 430A and other support examples mapped to other topic labels within the topic catalog). Based on that comparison, the system (e.g., the topic label engine 104) may identify one or more support examples to which the topic description 424 compares most closely, and the topic label with which the identified support examples are associated is determined to be the topic label 432 of the topic description 424. Because the topic description 424 is also associated with a communication segment (e.g., communication segment 110) as described herein, the determined topic label 432 may be assigned to or otherwise associated with that communication segment. When some or all of the communication segments of a communication transcript (e.g., communication transcript 122) are assigned topic labels as topic label results 432, the topic label results 432 may be provided in association with the communication transcript, enabling a consumer of the results 432 to more quickly determine and/or interpret the content of the communication transcript.

Additionally, or alternatively, the topic label results 432 may be used in conjunction with the associated communication transcripts to enable categorization and other data processing to be applied to the communication transcripts (e.g., transcripts in a database that are associated therein with the topic label results 432 may be searched for and otherwise analyzed based on those topic label result associations).

The use of the topic catalog 426 to map a topic description 424 from a summarization model into a specific topic label result 432 provides some advantages. Some models, such as the summarization model, may face "hallucinations" and/or they may be vulnerable to adversarial attacks. By including the additional step of mapping descriptions to topic labels, the system may be able to filter out or otherwise avoid the effects such issues with the summarization model.

The comparison of the topic description 424 to the support examples of the topic catalog 426 may be performed in several ways. In some examples, a "maximum similarity" process may be used, wherein the topic description 424 is compared to each support example to obtain a value indicating the similarity of the two entries and, after such a similarity value is calculated for each support example, the topic label associated with the support example with which the topic description 424 has the highest similarity value is chosen.

Alternatively, or additionally, an "averaged embeddings" process may be used, wherein the averaged embeddings (e.g., vectorized data of the letters/words/sentences of the support examples) of the set of support examples for each topic label are averaged and compared to embeddings of the topic description to calculate associated similarity values. The set of support examples with averaged embeddings that are most similar to the embeddings of the topic description indicate the topic label to be chosen for association with the topic description.

Further, choosing a topic label to be associated with a topic description may be based on defined thresholds. For instance, a similarity value between a topic description and the support example(s) associated with a topic label may be required to be above a defined threshold (e.g., 80%) for that topic label to be chosen for the topic description. In some examples, establishing such a threshold may result in some topic descriptions that are not associated with a topic label. Such topic descriptions and associated communication segments may be associated with a "no topic" or an "unknown topic" label. Alternatively, such topic descriptions may be associated with a best matching topic label, but they may also be flagged to indicate that the match to the topic label is more likely to be inaccurate. Other methods of handling topic descriptions that do not strongly match a topic label may be used without departing from the description.

In some examples, comparing topic descriptions to support examples is based on vectors generated from the words and/or phrases of the topic descriptions and support examples. Such use of vectors may enable faster and/or more accurate identification of similarities between the descriptions and examples than other methods that compare the letters, words, or phrases directly. For instance, the averaged embeddings process described above may first perform a word embedding process on the topic descriptions and the support examples, to form real-valued vectors of the words thereof that encode the meanings of the words such that the words that are closer in the vector space are expected to be similar in meaning. In other examples, other types of vector-based comparison methods may be used without departing from the description.

Further, in other examples, more or different methods of comparison may be used to map the topic descriptions to topic labels without departing from the description. For instance, instead of using either the maximum similarity process or the averaged embeddings process, the system may be configured to perform both processes and then select a topic label based on the results of both, with some logic for deciding between different results from the two processes. Alternatively, or additionally, other comparison methods may be used.

Returning to FIG. 1, in some examples, the topic catalog 126 may be defined to include a default set of topics and associated support examples and/or to include a customized set of topics and associated support examples as defined by, for instance, a customer using the system 100. For instance, if a user of a version of the topic label engine 104 is primarily interested in generating topic label results 132 from sales calls, the user may define a topic catalog 126 that includes sales call-based topic labels 130 and associated support examples 128 that are descriptive of those topic labels 130.

Further, such a user may submit a set of past sales call transcripts to the system 100 to be used as training communication transcripts 106, such that a summarization model 120 is trained specifically on the sales call communications submitted by the user. As a result, the topic label engine 104 using that summarization model 120 and the customized topic catalog 126 is fine-tuned for analysis of the sales call transcripts that the user wants to analyze.

In some examples, definition of the support examples 128 and/or associated topic labels 130 may be done automatically or otherwise based on automatically generated recommendations that a user may review. For instance, a user may define the topic labels 130 to be used and the topic label engine 104 or the system 100 more generally may be configured to automatically obtain recommended support examples based on those defined topic labels 130. The user may be enabled to review the recommended support examples and either accept or reject them, such that the resulting support examples 128 are customized by the user. Alternatively, the recommended support examples may be automatically included in the topic catalog 126 to be used in mapping descriptions to topic labels 130.

Additionally, or alternatively, the system 100 may be configured to prompt a user for whom the topic label engine 104 is being configured to review some or all the topic descriptions 116 of the segment-description tuples 114 used to train the summarization model 120. In reviewing the topic descriptions 116, the user may be prompted to classify those topic descriptions 116 to one or more of the topic labels 130 in the topic catalog 126. As a result of the user's classification, some or all of the classified topic descriptions 116 may be included as support examples 128 in the topic catalog 126 that are associated with the topic labels 130 according to the user's classifications.

Figure 5:
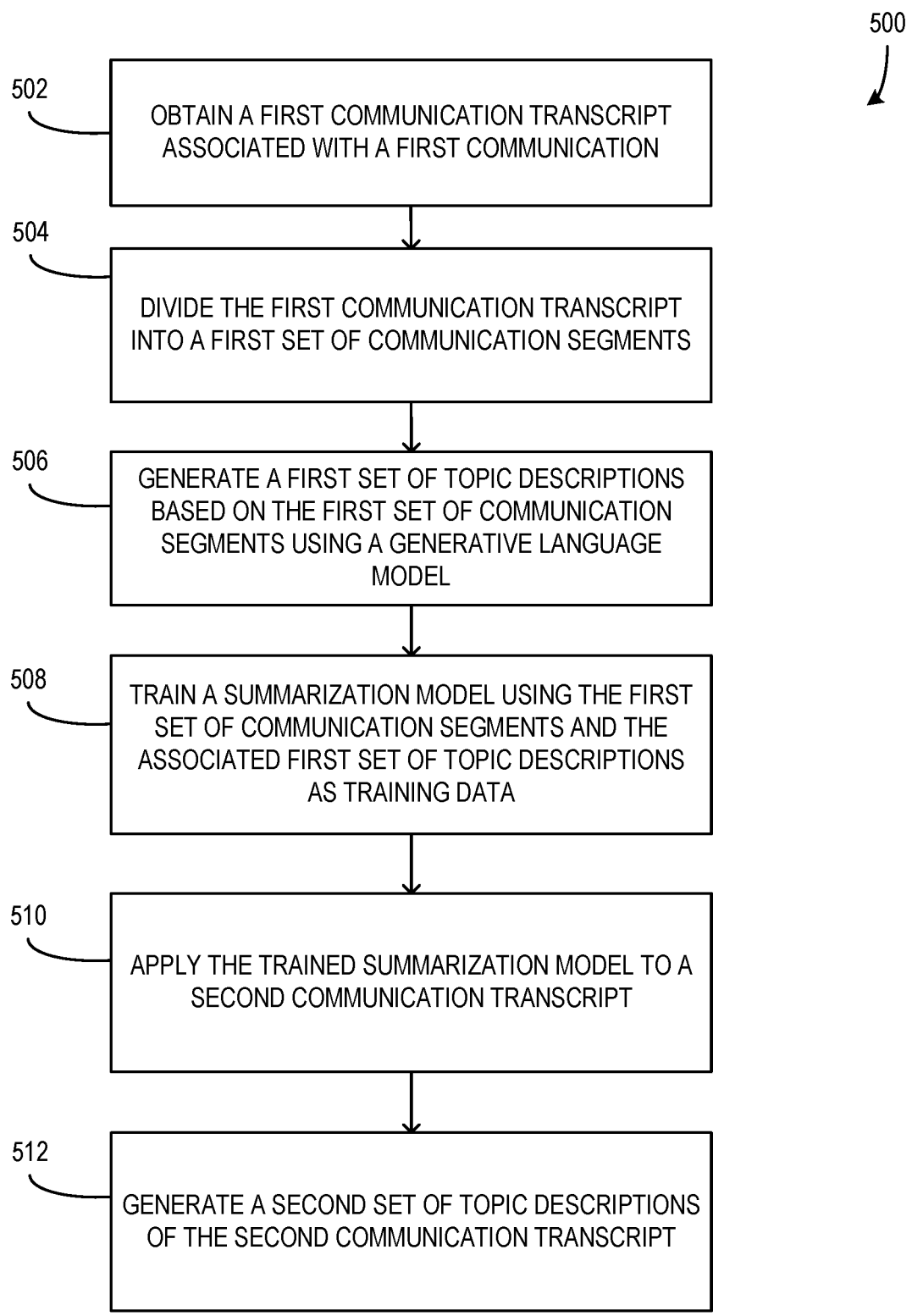
FIG. 5 is a flowchart illustrating a computerized method for training a summarization model to generate topic descriptions from communication transcripts according to an embodiment.

FIG. 5 is a flowchart illustrating a computerized method 500 for training a summarization model (e.g., summarization model 120) to generate topic descriptions (e.g., topic descriptions 124) from communication transcripts (e.g., communication transcripts 122) according to an embodiment. In some examples, the method 500 is performed on a system such as system 100 of FIG. 1 as described herein. At 502, a first communication transcript associated with a first communication is obtained. In some examples, the first communication transcript is a training communication transcript 106 as described above. The first communication transcript may be obtained from a user or customer in a set of communication transcripts that are representative of communications that will be analyzed to obtain associated topic labels.

At 504, the first communication transcript is divided into a first set of communication segments. In some examples, the first communication transcript is divided into segments using a transcript segmentation engine 108 of a summarization model trainer 102 as described herein.

At 506, a first set of topic descriptions is generated based on the first set of communication segments by analyzing each communication segment of the first set of communication segments with a GLM. In some examples, the generation of the first set of topic descriptions is based on a GLM 112 of a summarization model trainer 102 (e.g., the GLM is GPT-3 or the like). Further, generating topic descriptions from the GLM includes providing a communication segment to the GLM and then prompting the GLM to provide a topic description of the provided communication segment using a normal language prompt.

At 508, a summarization model is trained using the first set of communication segments and the associated first set of topic descriptions as training data. In some examples, the summarization model is trained by a model training engine 118 of a summarization model trainer 102 using segment-description tuples 114 as described herein.

At 510, the trained summarization model is applied to a second communication transcript and, at 512, a second set of topic descriptions of the second communication transcript is generated based on applying the trained summarization model. In some examples, the trained summarization model is applied to the second communication transcript and the second set of topic descriptions is generated in a topic label engine 104 as described herein. Further, in some examples, the second communication transcript is divided into communication segments and the trained summarization model is applied to those communication segments. Then, for each communication segment, a topic description is generated by the summarization model.

In some examples, a topic catalog (e.g., topic catalog 126) is defined that includes example topic descriptions (e.g., support examples 128) associated with topic labels (e.g., topic labels 130). The second set of topic descriptions are compared to the example topic descriptions of the topic catalog and, based on the comparison, the second set of topic descriptions is mapped to a set of topic labels of the topic catalog. The set of topic labels are provided in response to the second communication transcript.

Further, in some examples, the comparison of the topic descriptions to the example topic descriptions is based on a maximum similarity comparison or an averaged embeddings comparison as described herein.

Additionally, or alternatively, the comparison of the topic descriptions to the example topic descriptions includes comparing vectorized versions of the topic descriptions to vectorized versions of the example topic descriptions as described herein.

In some examples, defining the topic catalog may be based on default sets of topic labels and topic descriptions or based on customized sets of topic labels and topic descriptions. Further, recommended topic descriptions may be generated based on topic labels as described herein. Approval of recommended topic descriptions may cause those approved topic descriptions to be included in the topic catalog.

Figure 6:
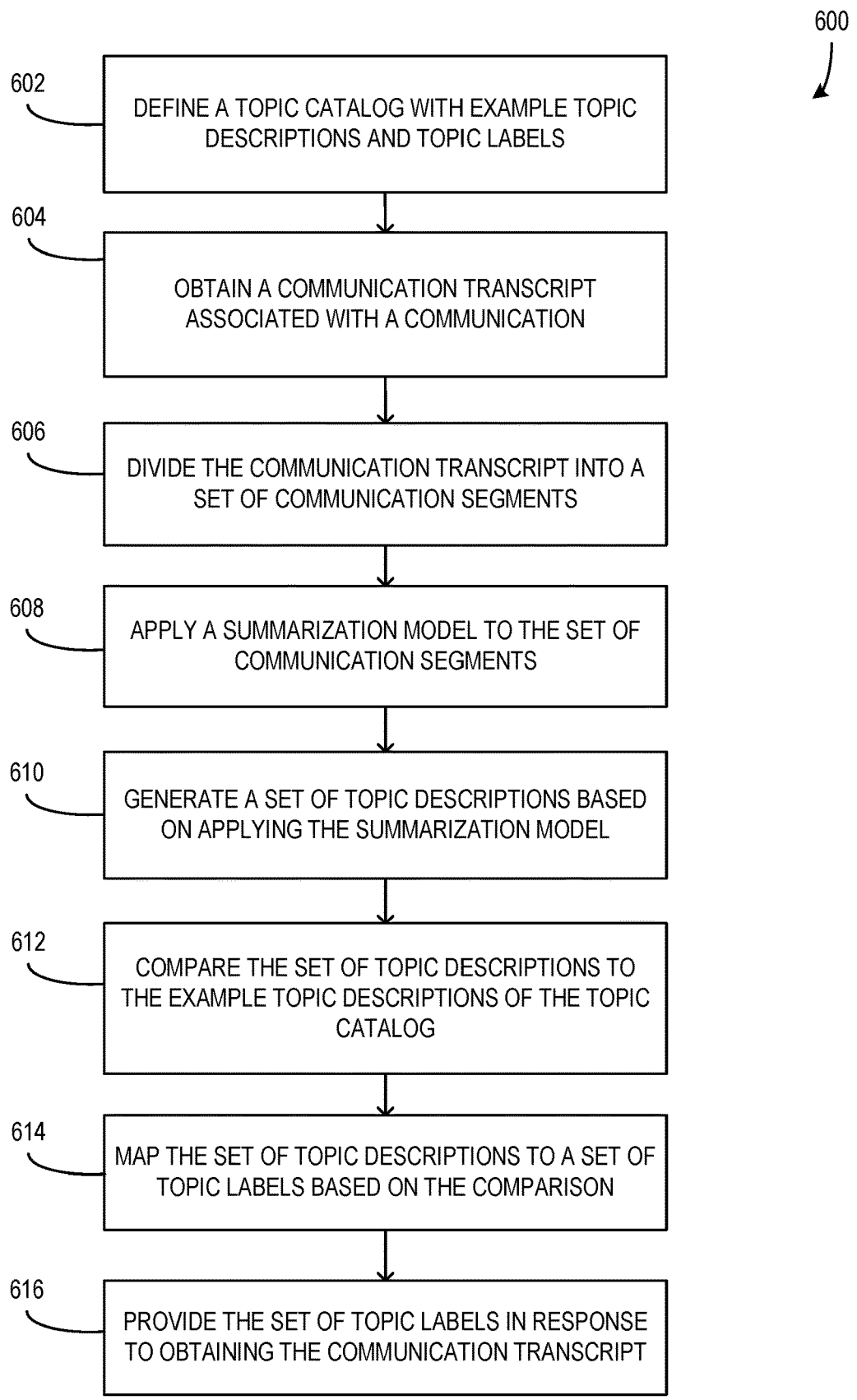
FIG. 6 is a flowchart illustrating a computerized method for providing topic labels of segments of communication transcripts using a summarization model according to an embodiment.

FIG. 6 is a flowchart illustrating a computerized method 600 for providing topic labels (e.g., topic label results 132) of segments of communication transcripts (e.g., communication transcripts 122) using a summarization model according to an embodiment. In some examples, the method 600 is performed on a system such as system 100 of FIG. 1. At 602, a topic catalog (e.g., topic catalog 126) is defined with example topic descriptions (e.g., support examples 128) and topic labels (e.g., topic labels 130).

At 604, a communication transcript (e.g., communication transcript 122) associated with a communication is obtained. At 604, the communication transcript is divided into a set of communication segments.

At 606, a summarization model (e.g., summarization model 120) is applied to the set of communication segments. Based on the application of the summarization model, at 610, a set of topic descriptions (e.g., topic descriptions 124) is generated from the communication segments.

At 612, the set of topic descriptions are compared to the example topic descriptions of the topic catalog and, based on the comparison, the set of topic descriptions are mapped to a set of topic labels. In some examples, the comparison and mapping are further based on a defined similarity threshold. For instance, for each pair of a topic description from the set of topic descriptions and an example topic description from the example topic descriptions of the topic catalog, a similarity value is calculated for the pair. Those similarity values are compared to a defined similarity threshold and mapping an associated topic label to the topic description requires that the associated similarity value exceeds the defined similarity threshold.

At 616, the set of topic labels are provided in response to the obtained communication transcript. In some examples, providing the set of topic labels includes displaying a GUI including a displayed timeline of the communication with which the communication transcript is associated and including displayed topic labels of the set of topic labels in association with the displayed timeline (e.g., the GUI of FIG. 7).

Figure 7:
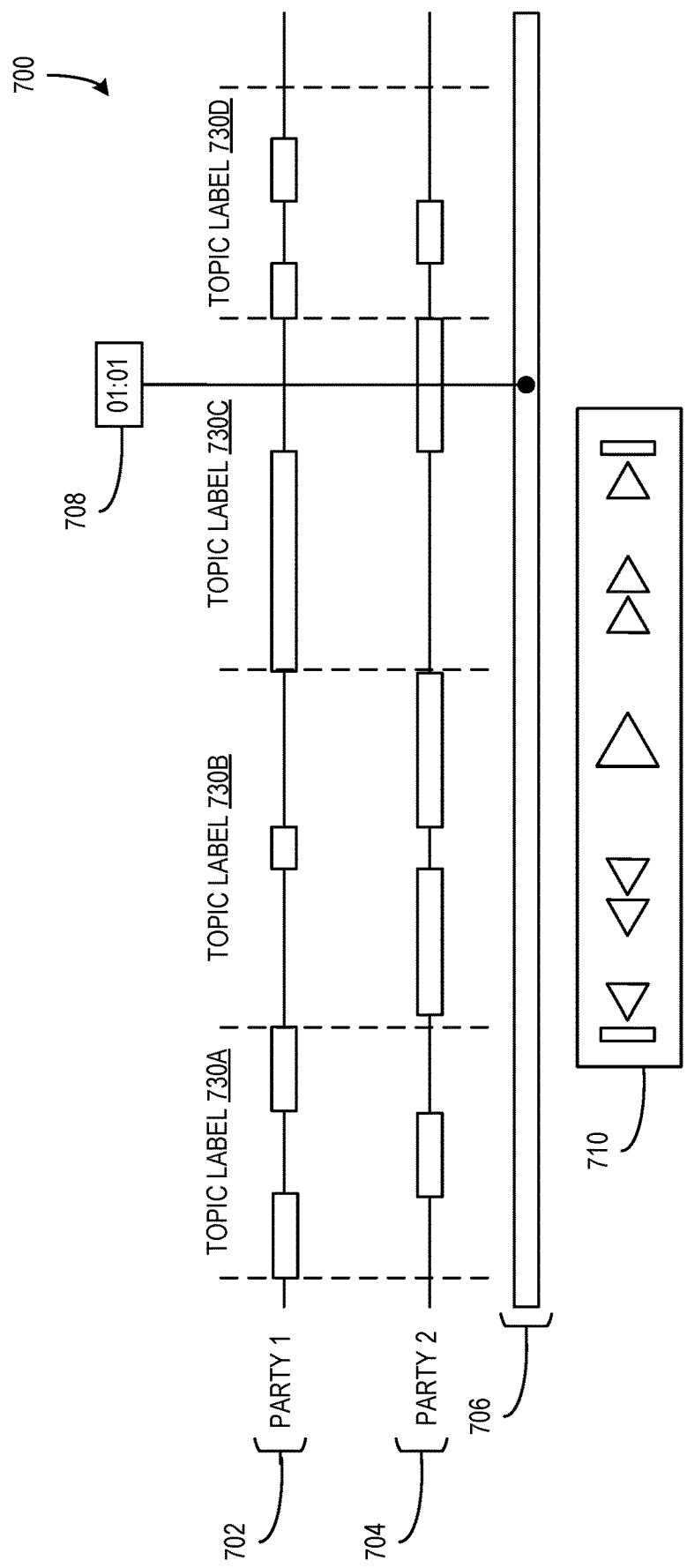
FIG. 7 is a diagram illustrating a graphical user interface (GUI) displaying topic labels associated with segments of a communication according to an embodiment.

FIG. 7 is a diagram illustrating a GUI 700 displaying topic labels 730A, 730B, 730C, and 730D associated with segments of a communication according to an embodiment. In some examples, the GUI 700 is displayed as part of the operations of a system such as system 100 of FIG. 1. The GUI 700 includes a visualization of a conversation or similar communication between two parties, Party 1 and Party 2.

The participation by Party 1 is displayed as a timeline 702 with bars along the timeline representing times during which Party 1 is speaking. The participation of Party 2 is displayed as a timeline 704 with bars along the timeline representing times during which Party 2 is speaking. The overall communication is further represented as a timeline 706 which enables a user to interact with a playback of the communication.

In some examples, while a recording of the communication is played, an indicator 708 represents a current point in the playing of the communication (e.g., as illustrated, the playback is at 1:01 of the communication). The playing of the recording may be controlled with an interface 710, which includes a "play" button, a "fast forward" button, a "rewind" button, an "end of track" button, and a "beginning of track" button. The "play" button may be configured to cause the communication to play at normal speed from the current point. The "fast forward" button may cause the indicator 708 of the current place in the communication to advance through the communication rapidly. The "rewind" button may cause the indicator 708 of the current place in the communication to move backward through the communication. The "end of track" button may cause the indicator 708 of the current place in the communication to move to the end of the communication. The "beginning of track" button may cause the indicator 708 of the current place in the communication to move to the beginning of the communication. In other examples, more, fewer, or different types of interfaces may be displayed in the GUI 700 without departing from the description. For instance, a button may be included that jumps the indicator 708 to the start of the next topic labeled segment and/or that jumps the indicator 708 to the start of the previous topic labeled segment.

Exemplary Operating Environment

Figure 8:
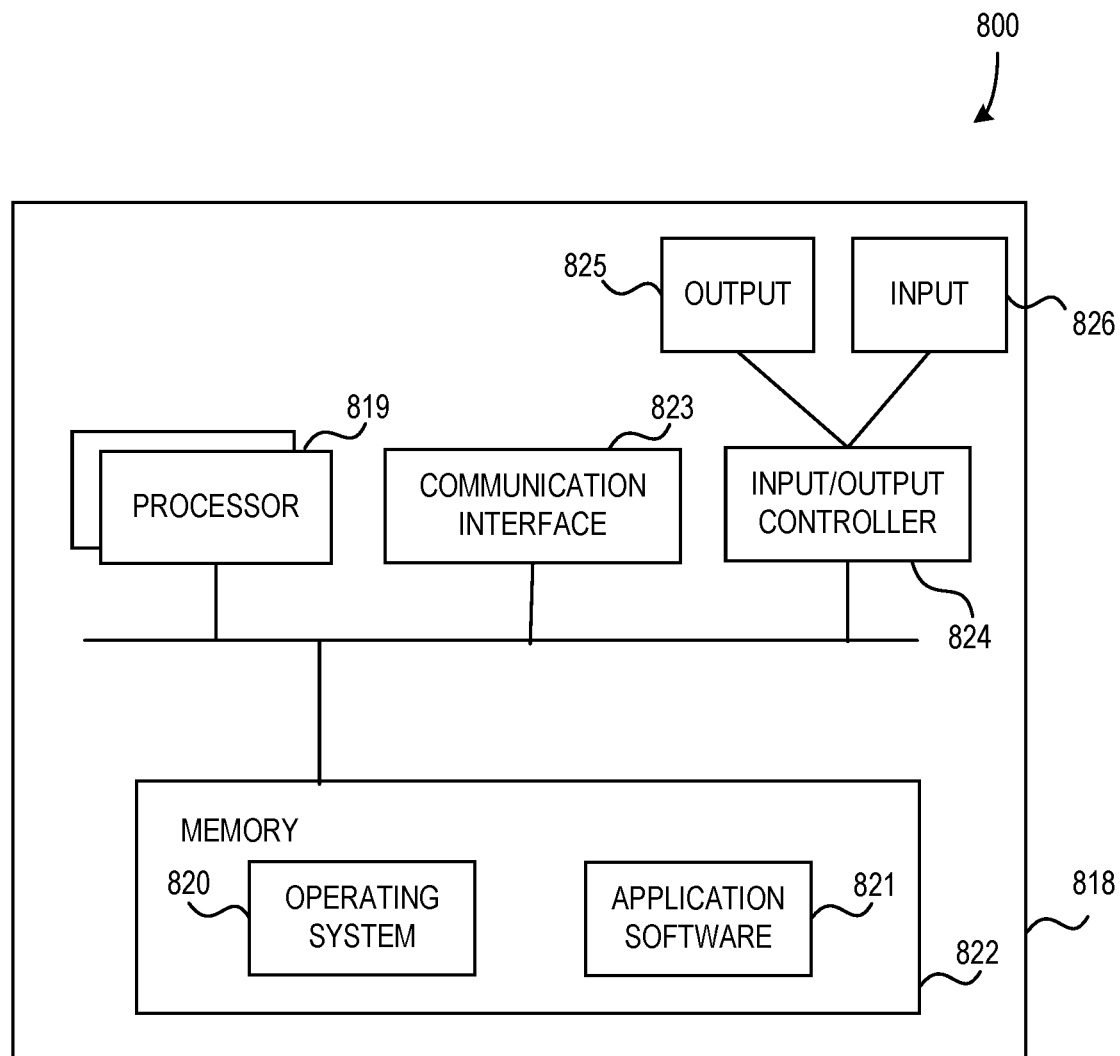
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hard-coded machine. Platform software comprising an operating system 820 or any other suitable platform software may be provided on the apparatus 818 to enable application software 821 to be executed on the device. According to an embodiment, training and using a summarization model to provide topic labels for communication transcripts as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device (s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for determining topics of communication transcripts comprises: at least one processor; and at least one memory comprising computer program code, the at least one memory and the computer program code configured to, with the at least one processor, cause the at least one processor to: obtain a first communication transcript associated with a first communication; divide the first communication transcript into a first set of communication segments; generate a first set of topic descriptions based on the first set of communication segments by analyzing each communication segment of the first set of communication segments with a generative language model; train a summarization model using the first set of communication segments and associated first set of topic descriptions as training data; apply the trained summarization model to a second communication transcript; and based on applying the trained summarization model to the second communication transcript, generate a second set of topic descriptions of the second communication transcript.

An example computerized method for determining topics of communication transcripts comprises: obtaining, by a processor, a first communication transcript associated with a first communication; dividing, by the processor, the first communication transcript into a first set of communication segments; generating, by the processor, a first set of topic descriptions based on the first set of communication segments by analyzing each communication segment of the first set of communication segments with a generative language model; training, by the processor, a summarization model using the first set of communication segments and associated first set of topic descriptions as training data; applying, by the processor, the trained summarization model to a second communication transcript; and based on applying the trained summarization model to the second communication transcript, generating, by the processor, a second set of topic descriptions of the second communication transcript.

One or more computer storage media having computer-executable instructions for determining topics of communication transcripts that, upon execution by a processor, cause the processor to at least: define a topic catalog including example topic descriptions associated with topic labels; obtain a communication transcript associated with a communication; divide the communication transcript into a set of communication segments; apply a summarization model to the set of communication segments; based on applying the summarization model to the set of communication segments, generate a set of topic descriptions, wherein each segment of the set of communication segments is associated with a topic description of the set of topic descriptions; compare the set of topic descriptions to the example topic descriptions of the topic catalog; based on comparing the set of topic descriptions to the example topic descriptions of the topic catalog, map the set of topic descriptions to a set of topic labels of the topic catalog; and provide the set of topic labels in response to obtaining the communication transcript.

Alternatively, or in addition to the other examples described herein, examples include any combination of the following:
  wherein applying the trained summarization model to the second communication transcript includes: dividing, by the processor, the second communication transcript into a second set of communication segments; applying, by the processor, the summarization model to the second set of communication segments; and based on the applying the summarization model to the second set of communication segments, generating, by the processor, a second set of topic descriptions, wherein each segment of the second set of communication segments is associated with a topic description of the second set of topic descriptions.
  further comprising: defining, by the processor, a topic catalog including example topic descriptions associated with topic labels; comparing, by the processor, the second set of topic descriptions to example topic descriptions of the topic catalog; based on comparing the second set of topic descriptions to example topic descriptions of the topic catalog, mapping, by the processor, the second set of topic descriptions to a set of topic labels of the topic catalog; and providing, by the processor, the set of topic labels in response to receiving the second communication transcript.
  wherein comparing the second set of topic descriptions to example topic descriptions includes at least one of the following: comparing based on maximum similarity and comparing based on averaged embeddings.
  wherein comparing the second set of topic descriptions to example topic descriptions includes comparing vectorized versions of the second set of topic descriptions to vectorized versions of the example topic descriptions.
  wherein defining the topic catalog includes: generating recommended example topic descriptions based on the topic labels of the topic catalog; and based on receiving approval of the recommended example topic descriptions, including the approved example topic descriptions in the topic catalog.
  wherein generating the first set of topic descriptions based on the first set of communication segments by analyzing each communication segment of the first set of communication segments with a generative language model includes: providing a communication segment to the generative language model; and prompting the generative language model to provide a topic description of the provided communication segment using a normal language prompt.

wherein comparing the set of topic descriptions to the example topic descriptions includes at least one of the following: comparing based on maximum similarity and comparing based on averaged embeddings.

wherein comparing the set of topic descriptions to example topic descriptions includes comparing vectorized versions of the set of topic descriptions to vectorized versions of the example topic descriptions.

wherein defining the topic catalog includes: generating recommended example topic descriptions based on the topic labels of the topic catalog; and based on receiving approval of the recommended example topic descriptions, including the approved example topic descriptions in the topic catalog.

wherein comparing the set of topic descriptions to the example topic descriptions of the topic catalog includes: for each pair of a topic description from the set of topic descriptions and an example topic description from the example topic descriptions of the topic catalog, calculating a similarity value for the pair; comparing the calculated similarity value to a similarity threshold; and wherein mapping the topic description of the pair to a topic label associated with the example topic description of the pair is based on the calculated similarity value exceeding the similarity threshold.

wherein providing the set of topic labels in response to obtaining the communication transcript includes displaying a graphical user interface (GUI) including a displayed timeline of the communication with which the communication transcript is associated and including displayed topic labels of the set of topic labels in association with the displayed timeline.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a processor, a first communication transcript associated with a first communication; exemplary means for dividing, by the processor, the first communication transcript into a first set of communication segments; exemplary means for generating, by the processor, a first set of topic descriptions based on the first set of communication segments by analyzing each communication segment of the first set of communication segments with a generative language model; exemplary means for training, by the processor, a summarization model using the first set of communication segments and associated first set of topic descriptions as training data; exemplary means for applying, by the processor, the trained summarization model to a second communication transcript; and based on applying the trained summarization model to the second communication transcript, exemplary means for generating, by the processor, a second set of topic descriptions of the second communication transcript.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system, comprising:
   a processor; and
   a memory comprising computer program code, the memory and the computer program code configured to, with the processor, cause the processor to:
   obtain a first communication transcript associated with a first communication;

divide the first communication transcript into a first set of communication segments;

analyze each communication segment of the first set of communication segments with a generative language model;

based on the analysis, generate a first set of topic descriptions based on the first set of communication segments;

train a summarization model using the first set of communication segments and associated first set of topic descriptions as training data;

apply the trained summarization model to a second communication transcript;

based on applying the trained summarization model to the second communication transcript, generate a second set of topic descriptions of the second communication transcript;

define a topic catalog including example topic descriptions associated with an example topic label;

map the second set of topic descriptions to the example topic description in the topic catalog;

generate a recommended topic label using the example topic label associated with the example topic description; and provide, on a graphical user interface (GUI), the generated recommended topic label as a timeline displayed on the GUI, the timeline including the generated topic label for the first set of communication segments and a second set of communication segments.

2. The system of claim 1, wherein applying the trained summarization model to the second communication transcript includes:

dividing the second communication transcript into a second set of communication segments;

applying the trained summarization model to the second set of communication segments; and based on the applying the trained summarization model to the second set of communication segments, generating the second set of topic descriptions, wherein each segment of the second set of communication segments is associated with a topic description of the second set of topic descriptions.

3. The system of claim 1, wherein mapping the second set of topic descriptions to the example topic descriptions includes at least one of the following: comparing based on maximum similarity and comparing based on averaged embeddings.

4. The system of claim 1, wherein mapping the second set of topic descriptions to the example topic descriptions includes comparing vectorized versions of the second set of topic descriptions to vectorized versions of the example topic descriptions.

5. The system of claim 1, wherein defining the topic catalog includes:

generating, by the processor, recommended example topic descriptions based on the topic labels of the topic catalog; and receiving approval of the recommended example topic descriptions, including the approved example topic descriptions in the topic catalog.

6. The system of claim 1, wherein generating the first set of topic descriptions based on the first set of communication segments by analyzing each communication segment of the first set of communication segments with the generative language model includes:

providing a communication segment to the generative language model; and prompting the generative language model to provide a topic description of the provided communication segment using a normal language prompt.

7. A computerized method, comprising:

obtaining, by a processor, a first communication transcript associated with a first communication;

dividing, by the processor, the first communication transcript into a first set of communication segments;

analyzing, by the processor, each communication segment of the first set of communication segments with a generative language model;

based on the analysis, generating, by the processor, a first set of topic descriptions based on the first set of communication segments;

training, by the processor, a summarization model using the first set of communication segments and associated first set of topic descriptions as training data;

applying, by the processor, the trained summarization model to a second communication transcript;

based on applying the trained summarization model to the second communication transcript, generating, by the processor, a second set of topic descriptions of the second communication transcript;

defining, by the processor, a topic catalog including example topic descriptions associated with an example topic label;

mapping, by the processor, the second set of topic descriptions to the example topic description in the topic catalog;

generating, by the processor, a recommended topic label using the example topic label associated with the example topic description; and providing, on a graphical user interface (GUI), the generated recommended topic label as a timeline displayed on the GUI, the timeline including the generated topic label for the first set of communication segments and a second set of communication segments.

8. The computerized method of claim 7, wherein applying the trained summarization model to the second communication transcript includes:

dividing, by the processor, the second communication transcript into a second set of communication segments;

applying, by the processor, the trained summarization model to the second set of communication segments; and based on the applying the trained summarization model to the second set of communication segments, generating, by the processor, the second set of topic descriptions, wherein each segment of the second set of communication segments is associated with a topic description of the second set of topic descriptions.

9. The computerized method of claim 7, wherein mapping the second set of topic descriptions to the example topic descriptions includes at least one of the following: comparing based on maximum similarity and comparing based on averaged embeddings.

10. The computerized method of claim 7, wherein mapping the second set of topic descriptions to the example topic descriptions includes comparing vectorized versions of the second set of topic descriptions to vectorized versions of the example topic descriptions.

11. The computerized method of claim 7, wherein defining the topic catalog includes:

generating recommended example topic descriptions based on the topic labels of the topic catalog; and receiving approval of the recommended example topic descriptions, including the approved example topic descriptions in the topic catalog.

12. The computerized method of claim 7, wherein generating the first set of topic descriptions based on the first set of communication segments by analyzing each communication segment of the first set of communication segments with the generative language model includes:

providing a communication segment to the generative language model; and prompting the generative language model to provide a topic description of the provided communication segment using a normal language prompt.

13. One or more computer storage media having computer-executable instructions that, upon execution by a processor, cause the processor to at least:

obtain a first communication transcript associated with a first communication;

divide the first communication transcript into a first set of communication segments;

analyze each communication segment of the first set of communication segments with a generative language model;

based on the analysis, generate a first set of topic descriptions based on the first set of communication segments;

train a summarization model using the first set of communication segments and associated first set of topic descriptions as training data;

apply the trained summarization model to a second communication transcript;

generate a second set of topic descriptions of the second communication transcript using the trained summarization model;

define a topic catalog including example topic descriptions associated with an example topic label;

map the second set of topic descriptions to the example topic descriptions of the topic catalog;

generate a recommended topic label using the example topic label associated with the example topic description; and provide, on a graphical user interface (GUI), the generated recommended topic label as a timeline displayed on the GUI, the timeline including the generated recommended topic label for the first set of communication segments and a second set of communication segments.

14. The one or more computer storage media of claim 13, wherein comparing the set of topic descriptions to the example topic descriptions includes at least one of the following: comparing based on maximum similarity and comparing based on averaged embeddings.

15. The one or more computer storage media of claim 13, wherein comparing the set of topic descriptions to the example topic descriptions includes comparing vectorized versions of the set of topic descriptions to vectorized versions of the example topic descriptions.

16. The one or more computer storage media of claim 15, wherein defining the topic catalog includes:

generating recommended example topic descriptions based on the topic labels of the topic catalog; and receiving approval of the recommended example topic descriptions, including the approved example topic descriptions in the topic catalog.

17. The one or more computer storage media of claim 13, wherein comparing the set of topic descriptions to the example topic descriptions of the topic catalog includes:

for each pair of a topic description from the set of topic descriptions and an example topic description from the example topic descriptions of the topic catalog, calculating a similarity value for the pair;

comparing the calculated similarity value to a similarity threshold; and wherein mapping the topic description of the pair to a topic label associated with the example topic description of the pair is based on the calculated similarity value exceeding the similarity threshold.

* * * * *